(12) United States Patent
Bittenson

(10) Patent No.: US 6,570,713 B2
(45) Date of Patent: May 27, 2003

(54) METHOD AND APPARATUS FOR OPTIMIZING THE OUTPUT BEAM CHARACTERISTICS OF A LASER

(75) Inventor: Steven N. Bittenson, Bedford, MA (US)

(73) Assignee: Silicon Valley Group, Inc., San Jose, CA (US)

(*) Notice: Subject to any disclaimer, the term of this patent is extended or adjusted under 35 U.S.C. 154(b) by 0 days.

(21) Appl. No.: 09/793,126

(22) Filed: Feb. 27, 2001

(65) Prior Publication Data

US 2002/0118721 A1 Aug. 29, 2002

(51) Int. Cl.⁷ ............... G02B 27/12; H01S 3/10; H01S 3/08
(52) U.S. Cl. ............... 359/640; 359/639; 372/20; 372/100
(58) Field of Search ............... 359/238, 264, 359/618, 558, 639, 640; 250/492.1, 492.2; 355/53, 55; 372/19, 20, 59, 57, 100

(56) References Cited

U.S. PATENT DOCUMENTS 6,154,470 A * 11/2000 Basting et al. ............ 372/19
6,219,368 B1 * 4/2001 Govorkov ............ 372/59
6,240,110 B1 * 5/2001 Ershov ............ 372/20
6,381,256 B1 * 4/2002 Stamm ............ 372/19

* cited by examiner

Primary Examiner—Georgia Epps
Assistant Examiner—Gary O'Neill
(74) Attorney, Agent, or Firm—Sterne, Kessler, Goldstein & Fox P.L.L.C.

(57) ABSTRACT

The use of refractive optical elements to reduce or eliminate unwanted wavelength components from a laser emission. The method and apparatus described herein introduces modifications to the parallelism of one or more existing optical elements within the laser to dispersively separate wavelength components of the laser emission. According to embodiments of the invention, modifications in the parallelism can be made to the output coupler, intra-cavity polarizing optical components, and extra-cavity beamsplitter to accomplish separation of wavelength components without the introduction of additional optical components or reduction in the operating capacity of the laser. Additional optical components can be used to accomplish further separation of the wavelength components after the laser beam leaves the laser resonator.

17 Claims, 7 Drawing Sheets

METHOD AND APPARATUS FOR OPTIMIZING THE OUTPUT BEAM CHARACTERISTICS OF A LASER

BACKGROUND OF THE INVENTION

1. Field of the Invention

This invention relates generally to wavelength dispersion in optical systems.

2. Background Art

Molecular fluorine gas lasers are employed to produce powerful deep ultraviolet laser light sources. These light sources are used in a variety of applications, such as atomic and molecular research, optic and mechanical component development, and photolithography.

Molecular fluorine gas lasers typically emit ultraviolet light in the 156–158 nanometer (nm) spectral region (hereinafter referred to as the "ultraviolet" laser emission). The molecular fluorine gas laser also emits light in the spectral region between 600 nm and 800 nm, in the visible to near infrared spectral region. This emission band is hereinafter referred to as the "red" emission.

The presence of this red emission is often undesirable for applications which employ the ultraviolet emission, such as photolithography. Various techniques are available to reduce or eliminate the red emissions. These techniques include modifications to the laser's gas composition, wavelength dispersive technology, and wavelength selective optical coatings. However, these techniques can reduce the performance of the laser.

For example, one technique modifies the gas composition of the laser to reduce or eliminate the red light emission, but it also reduces overall laser performance, especially at high (multi-kilohertz) repetition rates desirable for laser photolithography (e.g., as in pulsed or switching laser implementations).

In one specific example, neon gas is substituted for helium gas in a laser gas mix to reduce or eliminate the red light. The disadvantages of neon are that it is much more expensive than helium and that it can reduce performance at high repetition rates.

Furthermore, the red light emission from the molecular fluorine gas laser has significant superradiant character that it is not effectively removed by current techniques. For example, it is well-known that the introduction of laser spectral line selection technology at the high reflector end of the laser resonator will have a wavelength dispersive effect. Unfortunately, molecular fluorine gas lasers using such dispersive laser line selection technology can still emit 2% or more of the output energy in the red emission component.

Additionally, selective coatings on optical surfaces that are either internal or external to the laser resonator can reduce the red emission component, but complicate the optical delivery system. For instance, wavelength-selective optical coatings can be used to remove the red emission, but they typically degrade the reliability, durability and/or performance of the laser.

Therefore, in view of the above, what is needed is a method and apparatus for optimizing the output beam characteristics of a laser. Such a method and apparatus needs to remove the red emissions from the output beam without compromising laser or optical system performance. Further, what is needed is a method and apparatus that can remove the red emission component without reducing the effective output energy of the laser.

BRIEF SUMMARY OF THE INVENTION

The present invention uses refractive optical elements, such as lenses, to reduce or eliminate unwanted wavelength components from the emission of a laser source while minimizing any optical losses introduced by the method and apparatus. A method and apparatus reduce losses over existing techniques and improve overall laser performance. System performance is improved by reducing or eliminating the red emission in a broad range of applications. In one embodiment, the present invention eliminates the red light emission from an output beam of a laser. In another embodiment, the present invention eliminates the red light emission from a beam monitoring and/or beam regulation component.

The method modifies the parallelism of optical components to disperse wavelength components from the emissions of a laser.

One advantage of the invention is that it enhances the performance of a laser beamsplitter by dispersively separating red light emissions from ultraviolet light emissions in the output laser beam.

Another advantage of the invention is that it improves design control of the fraction of light extracted for output monitoring or pulse energy regulation. Yet another advantage is that the invention can separate the red and ultraviolet components for the monitoring and regulation functions.

Further embodiments, features, and advantages of the invention, as well as the structure and operation of the various embodiments of the invention, are described in detail below with reference to the accompanying drawings.

BRIEF DESCRIPTION OF THE DRAWINGS/FIGURES

The accompanying drawings, which are incorporated herein and form a part of the specification, illustrate present invention and, together with the description, further serve to explain the principles of the invention and to enable a person skilled in the pertinent art(s) to make and use the invention.

Figure 1A:
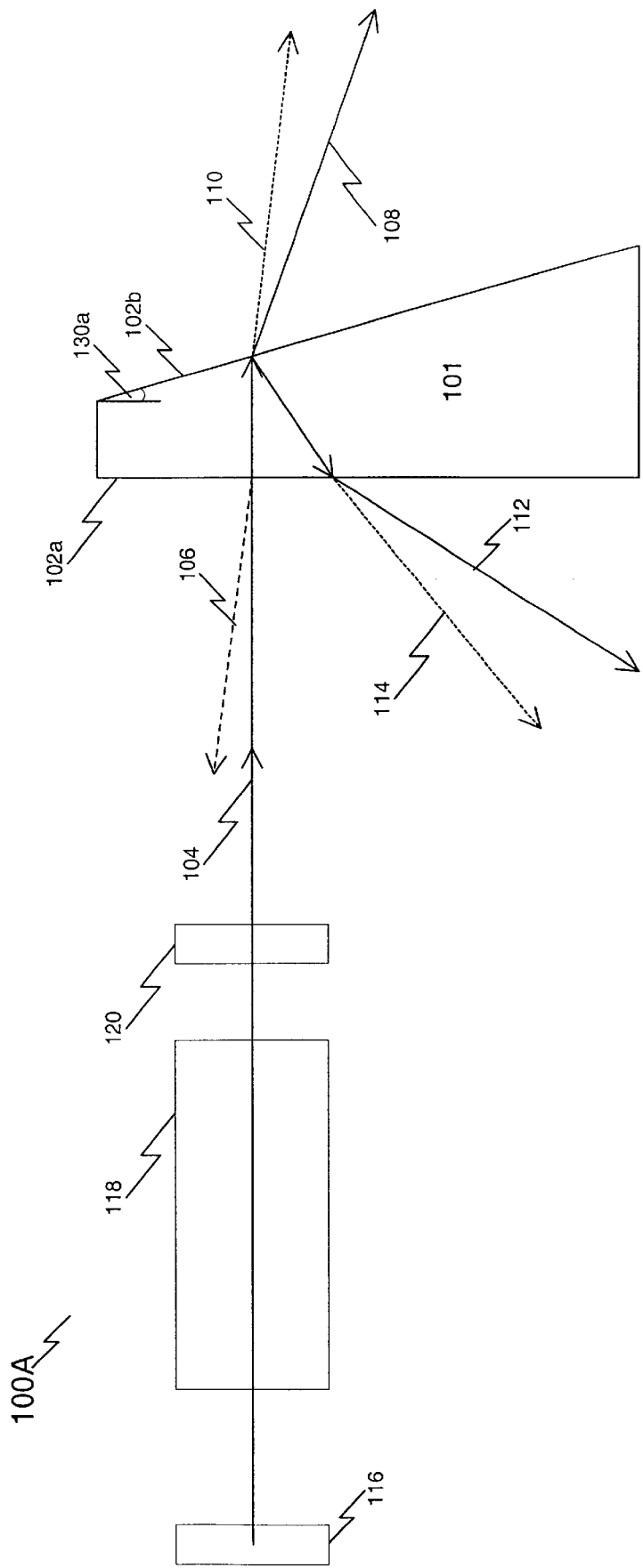
FIG. 1A is a schematic illustration of an optical projection system, according to an embodiment of the invention.

The present invention will now be described with reference to the accompanying drawings. In the drawings, like reference numbers indicate identical or functionally similar elements. Additionally, the left-most digit(s) of a reference number identifies the drawing in which the reference number first appears.

DETAILED DESCRIPTION OF THE INVENTION

Table of Contents

I. Overview
II. Terminology

III. Optimization of Beam Characteristics
IV. Example Implementations
V. Alternative Implementations
VI. Conclusion I. Overview The present invention optimizes the output beam characteristics of a laser. In one embodiment, this can improve the resulting imaging quality of optical systems employed in photolithography. To describe the invention, a terminology section is provided after the overview section. The overview section describes the method and apparatus of the invention. An optimization of beam characteristics section follows after the terminology section and discusses in more detail the method and apparatus of the invention. Finally, an example implementations section provides further discussion of embodiments of the invention taught herein (FIGS. 1A–4B).

II. Terminology

To more clearly delineate the present invention, an effort is made throughout the specification to adhere to the following term definitions as consistently as possible.

The term "ultraviolet" refers to light emissions in the ultraviolet region of the wavelength spectrum including, but not limited to, light in the 156–158 nm region. Additionally, the terms "ultraviolet emissions" and "ultraviolet light" are similarly used.

The term "red" refers to the light emissions in the region of the wavelength spectrum associated with visible red-colored light including, but not limited to, light in the 600–800 nm region. Additionally, the terms "red emissions" and "red light" are similarly used.

The term "gas composition" refers to the composition and state information of the molecular gas (fluid) stored in a container/cavity and used for the production of light.

The term "wavelength dispersive" refers to the effect a material has on an beam of light wherein the various color components are separated or dispersed. This is more readily understood in noting that the ratio between the speed of light in a vacuum and its speed in a material is called the refractive index (n). The index can be changed by altering the chemical or physical structure of the material which serves as a medium for the beam of light. As a general rule, when a beam of light, which is a combination of light of different wavelengths, passes through a material, the material disperses the light's components. This happens because each component moves at a different speed in the material, smearing out the original beam. Ordinarily, blue light emissions are slowed the most through the material, and thus deflected the farthest; red light emissions travel fastest through the material and are bent the least. The result is a dispersion according to wavelength.

The term "laser resonator" refers to a region with mirrors on opposite ends and a laser medium in between the ends. Generally, stimulated emission from the laser medium resonates between the mirrors, one of which lets some light emerge as a laser beam.

The term "fluence" refers to a time integral of flux, which is a number of photons which pass through a surface in a given time.

II. Optimization of Beam Characteristics

The present invention is directed to a method and apparatus for optimizing the output beam characteristics of a laser. The output beam characteristics include the energies and wavelengths of the beam emitted from the laser. In one embodiment of the invention, a method modifies the parallelism of one or more optical elements within the laser to dispersively separate the red components from the ultraviolet components of the laser emission.

According to the method and apparatus of the invention, the set of optical components to which modifications can be made includes, but is not limited to, the output coupler, intra-cavity polarizing optics, if present, and the extra-cavity beamsplitter. Extra-cavity beamsplitters are typically used as part of the beam monitoring and/or pulse energy regulation systems.

While the invention is described herein in terms of the above-mentioned components, this is for convenience only and is not intended to limit its application. In fact, after reading the following description, it will be apparent to one skilled in the relevant art(s) how to implement the method and apparatus of the invention using additional optical components to accomplish separation of the red and ultraviolet emission components.

In the above embodiment, the dispersive (angular) spread of a molecular fluorine ultraviolet laser emission line (typically 1 picometer spectral width) due to the introduction of refractive/dispersive optical components, does not exceed two micro-radians. This small angular spread is negligible compared with laser beam divergence which is characteristically more than 1000 times larger in the range of 1 to 15 milli-radians. Thus, the modifications to the parallelism of the optical components do not alter the output beam characteristics appreciably. Therefore, red and ultraviolet beams are separated without the detrimental effects described herein.

In one embodiment, the present invention enhances the performance of laser beamsplitters by dispersively separating red from ultraviolet light emissions in an output laser beam, thus providing a greater degree of wavelength selectivity at the beamsplitter.

In another embodiment of the invention, a separation of the red from the ultraviolet light emissions improves design control of a fraction of light emissions extracted for output monitoring or pulse energy regulation. In yet another embodiment, the present invention separates red and ultraviolet light emissions for monitoring and regulation functions.

In an embodiment of the invention, optical components implemented using the method and apparatus of the invention can integrate their dispersive character with intra-cavity polarizing elements to improve the polarization of the laser output and/or to reduce the number of optical surfaces required in the laser.

In another embodiment of the invention, a method and apparatus of the invention can be used to reduce the effective fluence of the laser output beam by up to or exceeding approximately a factor of two, by increasing the laser beam width through refraction. This in turn can increase the operational lifetime of the output coupler, laser beamsplitter, and subsequent optical components of the delivery system.

In a further embodiment, a single refractive element at the output end of the laser that changes the pointing direction of the output beam can be supplemented with additional refractive elements to eliminate the red light and to recover the original pointing direction of the laser beam.

In the embodiments discussed herein, a method and apparatus of the invention are implemented without increasing the total number of optical surfaces in the laser, or depending on wavelength-selective optical coatings, or modifying the laser gain medium.

It is noted that, although the embodiments discussed herein are described in conjunction with the properties of molecular fluorine gas lasers, the method and apparatus of the invention is applicable to other laser devices, as will be apparent to one skilled in the relevant art(s) based on the teachings described herein.

IV. Example Implementations

The embodiments of the present invention described herein include optical components which are known in the relevant art. Optical components or devices include mirrors (metal or otherwise), lenses (glass or otherwise), etc. The surfaces of these components can be coated to alter the way in which radiation passes through them. Furthermore, the basic shapes of the optical components can be altered to alter the way in which radiation is passed through them. In some embodiments of the present invention, the combination of optical components and their alteration forms the method of the present invention and improves the output characteristics of a laser.

For example, a beamsplitter can be an optical device that uses one or more mirrors or prisms to divide a light beam into two or more paths. Monitoring devices can be photon measuring devices capable of determining the amount of radiation (i.e., light radiation or energy or number of photons) in a given area or volume. These devices can be used to determine the separation of emission or to otherwise characterize the laser output beam. An output coupler or laser output coupler can be mirror or device for getting photons out of the laser cavity (i.e., the resonator or oscillator).

In some embodiments of the present invention, the optical components are aligned to take advantage of Brewster's angle. For light incident on a plano-boundary between two materials having different index of refraction, that angle of incidence at which the reflectance is zero for light that has its electrical field vector in the plane defined by the direction of propagation and the normal to the surface. For propagation from material 1 to material 2, Brewster's angle is given as tan−1 (n2/n1).

It is noted that in the figures describing the embodiments of the present invention reflective and refractive spatial and angular displacements (or deflections at surfaces) are shown for illustrative purposes and are not intended to limit the present invention.

The embodiments of the present invention are now described in detail. Most of the optical components are at the output end of the laser gain medium. In several embodiments of the present invention, the output coupler surface is perpendicular to the optical path. In many embodiments of the present invention, the Brewster's angle windows, if used, do not have coated surfaces.

In certain embodiments of the present invention, output coupler surfaces for excimer lasers can either be uncoated or coated for optimum reflectivity at a desired wavelength. One skilled in the relevant art would recognize based on the teachings herein that uncoated output couplers are generally considered more desirable because more laser energy is transmitted than through a coated output coupler.

In other embodiments, the prisms, such as beamsplitters, can be either uncoated or coated for similar reasons, as one skilled in the relevant art would recognize based at least on the teachings herein.

Referring to FIG. 1A, a schematic illustration of a modified optical component, according to an embodiment of the invention, is shown. A wedged, dispersive prism 101 replaces the parallel-faced beamsplitter commonly used in lasers for output energy monitoring and regulation. This component can also replace the laser output coupler, reducing the total number of optical components and surfaces in the laser.

The wedged prism 101 dispersively separates the ultraviolet and red components of both the exiting laser beam and the reflected (monitoring) beam from the beamsplitter. In FIG. 1A, the laser beam 104 enters the prism 101 at surface 102a. Surface 102a can be anti-reflection coated for low loss, or uncoated. In one embodiment, beamsplitter surface 102a can be oriented so that any light 106 reflected from surface 102a does not re-enter the laser resonator 100A in such a manner or intensity as to interfere with the performance of the laser resonator. In one embodiment, prism 101 can be a beamsplitter.

In summary, surface 102a is angled to the beam 104 and can be either coated or uncoated. Surface 102b acts as a beamsplitter surface and is also angled to the beam. System 100A separates the red from the ultra-violet external to the laser gain medium 118.

Figure 1B:
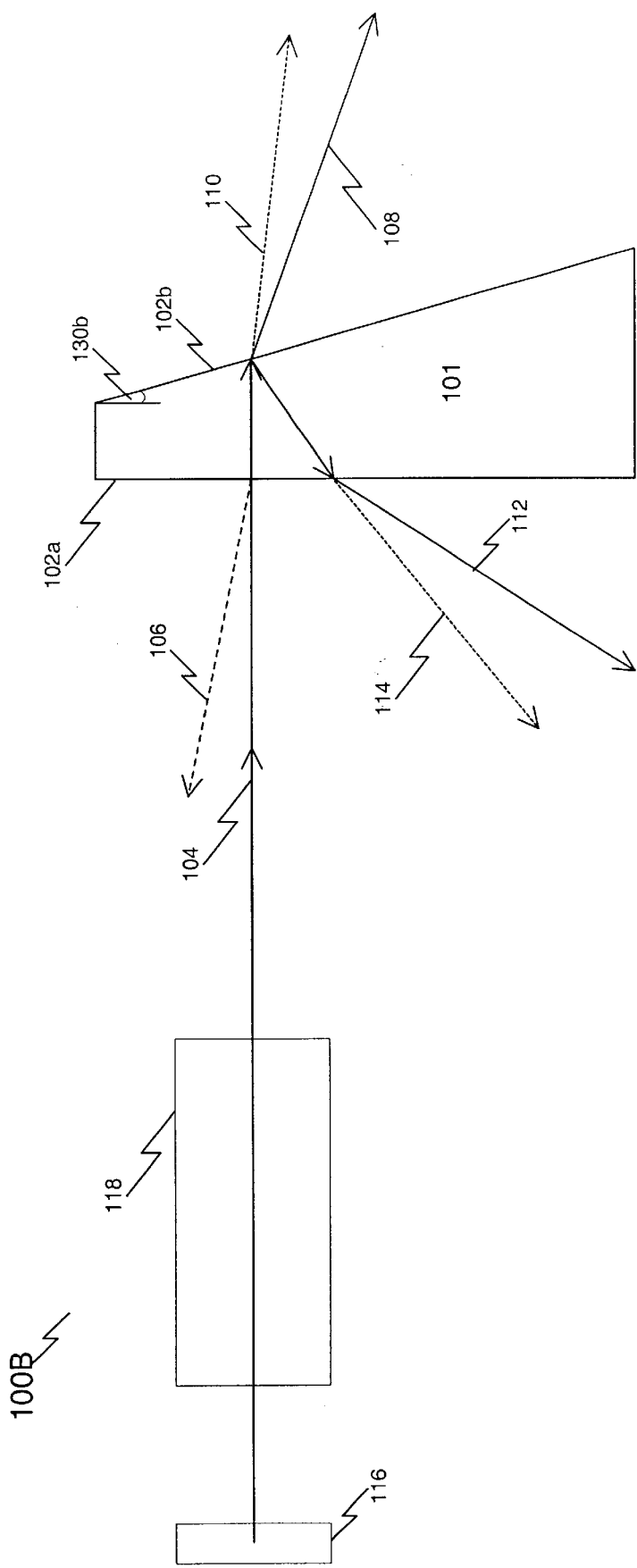
FIG. 1B is a schematic illustration of an optical projection system, according to another embodiment of the invention.

As shown in FIG. 1B, in an alternative embodiment, surface 102a can be used as the laser output coupler surface. Depending on the characteristics of the particular laser, surface 102a can be coated with a partially reflective coating or can be uncoated. In one embodiment, an excimer laser can use surface 102a uncoated as an output coupler surface. If surface 102a is used as the output coupler, then it is aligned to return the beam path 106 along the path of beam 104, as shown in FIG. 1B.

In an embodiment, if surface 102a is not used as the output coupler surface, the beamsplitter can be tilted so the reflected beam path 106 is neither collinear with 104 nor approaching the beam monitoring path 112.

System 100A shows laser gain medium 118 with reflector 116 and laser output coupler 120. Reflector 116 can be a highly reflective device that can include wavelength selective and/or line-narrowing properties. Output coupler 120 allows the light-beam to leave the resonator formed by components 116, 118, and 120.

Output coupler 120 can include, but is not limited to, an optical component (such as a lens or prism) having wavelength selective and/or anti-reflective coatings. Light beam 104 enters beamsplitter 101 at surface 102a, where its direction can be modified by refraction, depending on the angle between beam 104 and the normal to surface 102a. When the beam reaches the second surface 102b, which may be coated or uncoated depending on the specific application, part of the beam exits the beamsplitter through surface 102b. The red spectral component 110 and ultraviolet spectral component 108 leave the beamsplitter 101 at different angles and may be isolated by appropriate aperturing or beam stops further along the beam path.

According to an embodiment of the invention, the angle between surface 102a and surface 102b is chosen to provide adequate angular separation between the red path 110 and ultraviolet path 108 for the particular application. The reflected beam at surface 102b, typically in the range of 3% to 6% of the incident beam for an uncoated surface, returns to and exits the beamsplitter through surface 102a. Refraction at surface 102a additionally disperses the red component 114 and ultraviolet component 112. This enhances the suitability of beam 112 as an isolated ultraviolet beam to a laser's detector and energy regulation system.

An example implementation employing this embodiment of the invention is described. Laser beam 104 enters at near normal incidence to surface 102a. An approximately 14 degree wedge angle between surface 102a and surface 102b in a calcium fluoride beamsplitter 101 causes a deviation of beam 108 with respect to beam 104 of approximately 8 degrees, while the reflected beam 112 exits through surface 102a at approximately 45 degrees to entering beam 104.

Additionally, the wedge angle between surface 102a and surface 102b can be approximately within the range of 3 degrees to 40 degrees in order to obtain a deviation in beam 108.

In both FIGS. 1A and 1B in one embodiment, the red component 10 and ultraviolet component 108 of the output laser beam will become fully separated at a distance of approximately 160 mm following the beamsplitter 101 for a 4 milliradian divergent beam of approximately 4 mm cross section. The red component 114 and ultraviolet component 112 of the reflected beam will become fully separated at a distance of approximately 60 mm after exiting the beamsplitter 101.

Another example implementation of this embodiment of the invention is described. Laser beam 104 enters the wedge beamsplitter 101 at an incident angle equal to approximately 23 degrees from normal at surface 102a. An approximately 11 degree wedge angle, illustrated as wedge angle 130a in FIG. 1A and wedge angle 130b in FIG. 1B, between surface 102a and surface 102b in a calcium fluoride beamsplitter 101 causes a deviation of beam 108 with respect to beam 104 of approximately 8 degrees. The reflected beam 112 is further refracted after it exits at surface 102a.

Additionally, in example embodiments, not intended to limit the present invention, the wedge angle between surface 102a and surface 102b can be approximately within the range of 3 degrees to 40 degrees in order to obtain a deviation in beam 108.

In both implementations, the red component 110 and ultraviolet component 108 of the output laser beam will become fully separated at a distance of approximately 150 mm following the beamsplitter 101 for a 4 milliradian divergent beam of approximately 4 mm cross section. The red component 114 and ultraviolet component 112 of the reflected beam will become fully separated at a distance of approximately 40 mm after exiting the beamsplitter 101.

Further details for the design of a beamsplitter 101 for a particular application includes consideration of wavelengths, refractive index, critical angles, coatings, desired deviation of the beam paths, desired fraction of the laser beam diverted into the reflected beams 112 and 114, and physical location of any beam detector devices.

Figure 2A:
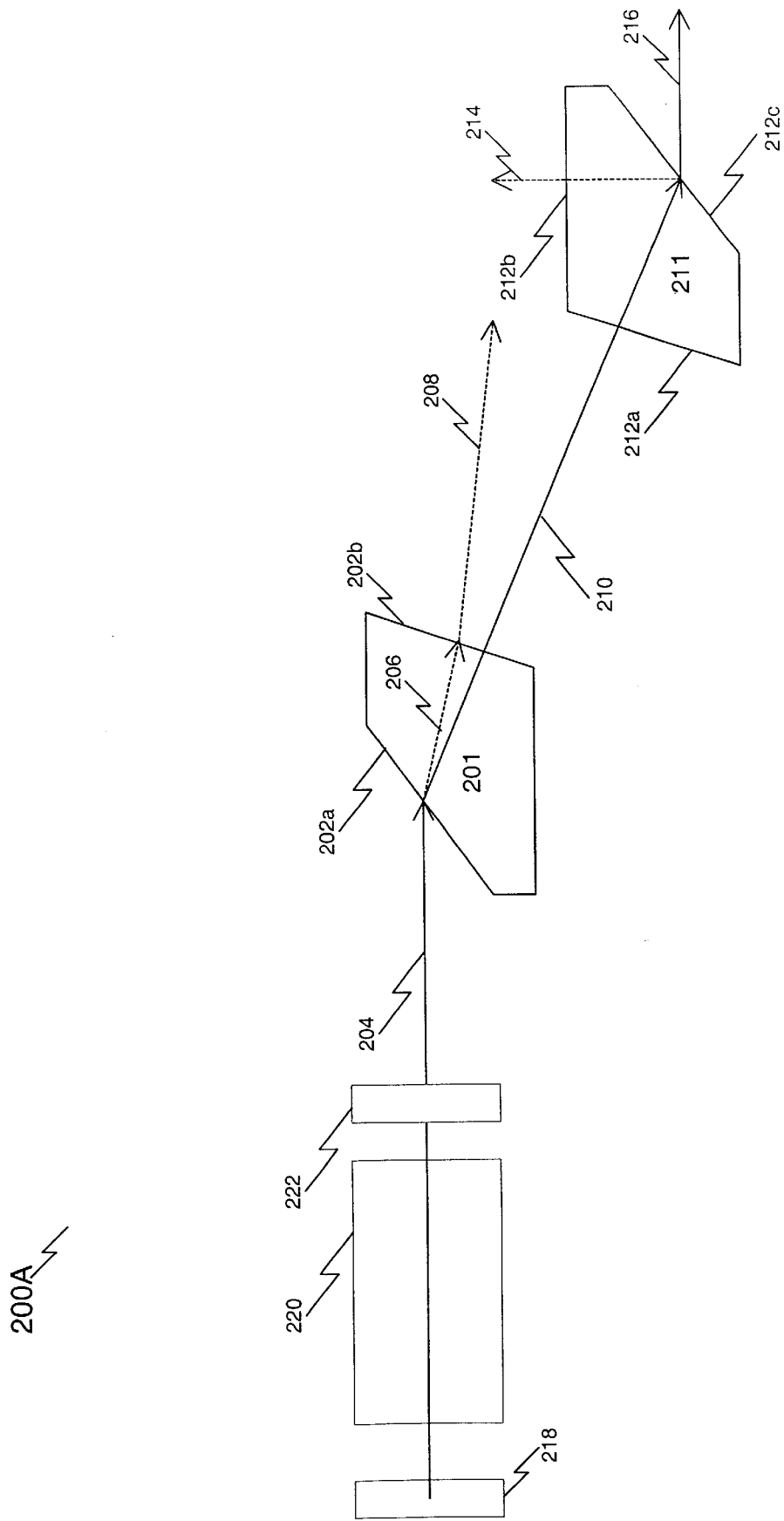
FIG. 2A is a schematic illustration of an optical projection system, according to another embodiment of the invention.

Referring to FIG. 2A, a schematic illustration of a modified optical component, according to another embodiment of the invention, is shown. This embodiment can replace either or both the laser output coupler 120 and the beamsplitter 101 of FIGS. 1A and 1B with wedged dispersive optics.

System 200A includes reflector 218, laser gain medium 220, and laser output coupler 222. In alternative embodiments, as shown in FIG. 2B and described herein, either or both of surfaces 202b and 212a, can be used, alone or in combination, as the laser output coupler in place of element 222.

Additionally, and this is not shown, output coupler 222 can be placed between components 201 and 211.

Figure 2B:
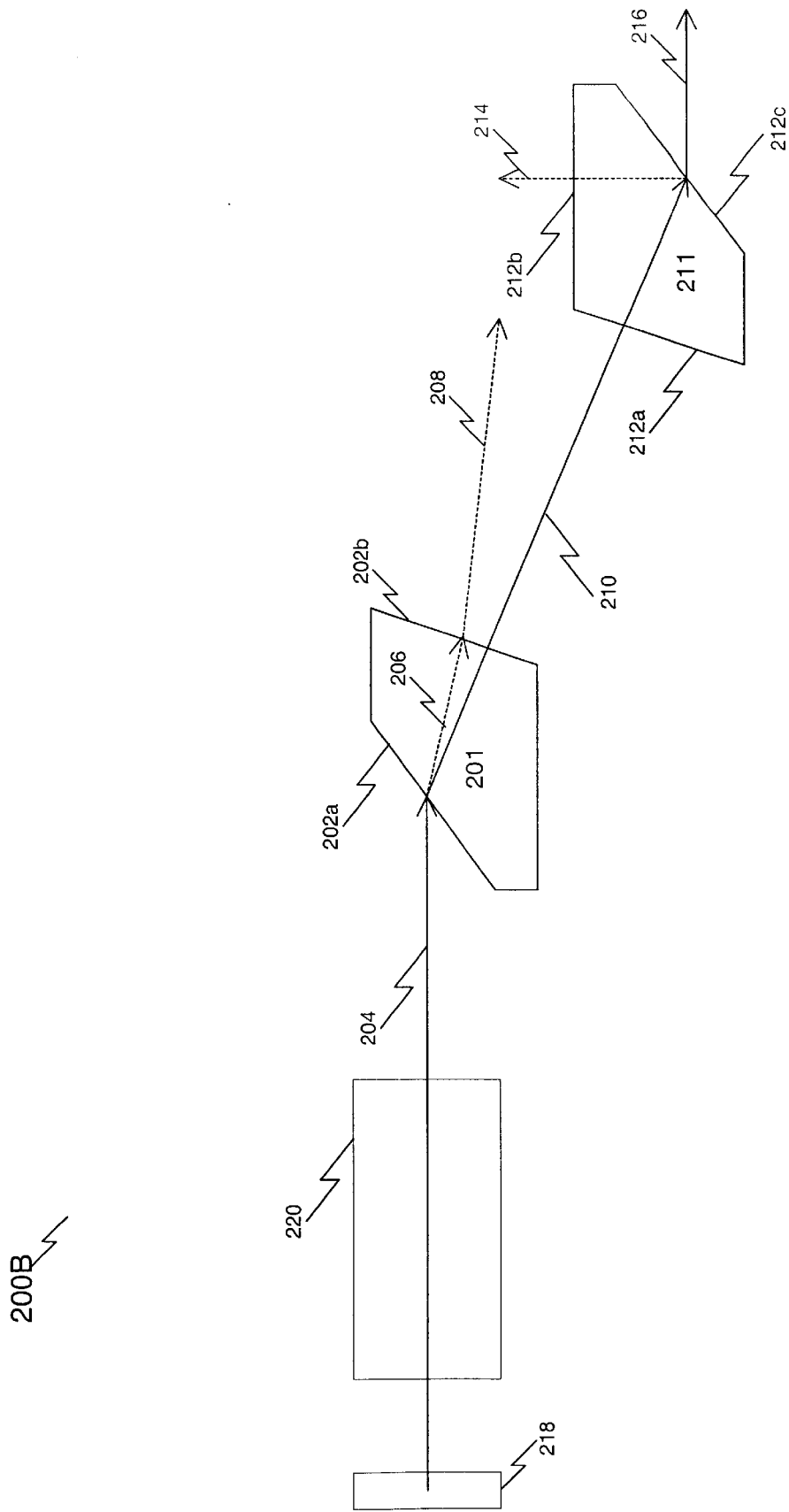
FIG. 2B is a schematic illustration of an optical projection system, according to another embodiment of the invention.

In both FIGS. 2A and 2B, a typical parallel-faced laser output coupler (a very slightly wedged output coupler, typically less than one degree, is used in some lasers, as one skilled in the relevant art would recognize based at least on the teachings described herein) is replaced in this embodiment with a wedged optical component 201 in which the beam 204 enters through surface 202a, which preferably is oriented at Brewster's angle to the laser medium's optical axis, but can be at another angle. In one embodiment, the orientation of this surface at Brewster's angle enhances the intra-cavity polarization of the laser.

The refracted red component 206 and refracted ultraviolet component 210 passes through coupler 201 to surface 202b, which can be oriented normal to the ultraviolet component 210 direction and can serve as the output coupler surface which may be uncoated or optically coated as required by the gain characteristics of the laser and the particular application.

In one embodiment, if surface 202b is not used as the output coupler surface, then it can be antireflection coated for the laser wavelength and/or oriented to ensure that return reflection does not provide feedback to the laser gain medium.

Refraction at surface 202a and at surface 202b separates the red component 208 and ultraviolet component 210 of the beam 204. The dispersion of the wedge ensures that the return reflection from surface 202b of the red component 206 is not aligned with the ultraviolet component 210, thus reducing the red light gain.

In an example implementation of the above described output coupler embodiment, output coupler 201 includes a material transparent to light of a wavelength in a range of 156–158 nm. In one embodiment, this material is calcium fluoride. A calcium fluoride output coupler 201 designed for use at approximately 157 nm, can have an angle between surface 202a and surface 202b of approximately 33 degrees, and deflection of the ultraviolet laser beam 210 by the output coupler will be approximately 25 degrees from beam 204. The red component 208 and ultraviolet component 210 of the output will be fully separated approximately 70 mm after exiting the coupler 201.

The fluence (energy per unit area) of the exiting beam will be reduced and the beam width increased by approximately 35% from nominal values for a parallel-surfaced output coupler, due to the refraction angle. The ultraviolet component 210 can be used as the output of the laser, and beam stops or apertures may be employed to block the red component 208.

Additionally, the wedge angle between surface 202a and surface 202b can be approximately within the range of 3 degrees to 40 degrees in order to obtain deviation in beam 210.

In another embodiment, the output coupler surface 202b can be planar, or curved (for example spherically or cylindrically) as part of an unstable resonator or other laser resonator system.

FIG. 2B also shows an embodiment of the invention in which the laser beam 210 exiting output coupler 201 enters a refractive beamsplitter 211 through surface 212a which can be at near-normal incidence or at another angle, and may be antireflection coated or may provide feedback to the laser as an output coupling surface.

The red component 208 is adequately separated from the ultraviolet component 210 that it can be blocked by an appropriate beam stop or made to miss the beamsplitter 211 entirely. At surface 212c, the ultraviolet beam 210 is refracted to redirect it in a desired direction, e.g., parallel to the original beam 204 direction.

The reflected beam 214 from surface 212c is directed out of the beamsplitter 211 through surface 212b toward, for example, beam monitoring or energy regulation apparatus. In one embodiment, surface 212b can be anti-reflective coated for the laser wavelength.

The reflectivity of surface 212c can be selected via its angle to the nominally polarized beam 210 to provide a desired reflectivity. This surface can be designed for very low reflectivity (low-loss) for output of a polarized beam by orienting it effectively near Brewster's angle for the exiting beam. This reflectivity requirement can be determined principally by the sensitivity of the beam monitoring apparatus.

In one embodiment, surface 212b simply passes the reflected portion out of the prism to the detector, and can be anti-reflection coated, or angled for convenient vectoring of the exiting light.

The output coupler 201 and the beamsplitter 211 described above can be used in combination, as shown in FIG. 2A. In this embodiment, the optical components maintain the pointing direction and the number of optical surfaces of a typical laser system. The embodiment of the invention also eliminates the red component 208 of the output beam, increases polarization of the output beam, provides a choice between two output coupler surfaces 202b and 212a, adds design control of the beamsplitter reflectivity, and maintains (or adds control of) the output beam pointing, relative to a laser which does not include refractive elements in the output path.

In an embodiment, the surfaces 202b and/or 212a can be planar or curved, e.g., spherically or cylindrically, to modify the characteristics of the laser resonator, e.g., as part of an unstable resonator system.

In an example implementation of the calcium fluoride wedged output coupler 201 described above, with a separation of elements 201 and 211 of approximately 100 mm, the ultraviolet component 210 has been displaced transversely from its original propagation axis by approximately 50 mm, and the red component 208 and ultraviolet component 210 centers are separated by approximately 9 mm. The physical dimensions and face-to-face angles of the beamsplitter 211 can be chosen to be identical with those of 201, or chosen differently depending upon a particular application or need, as discussed above with respect to FIGS. 1A and 1B.

In system 200A according to one embodiment of the present invention, the beam 210 enters the prism 211 at approximately 7 degrees to normal, and exits surface 212c at approximately 5 degrees to Brewster's angle. The prism's wedge in this case is approximately 35 degrees, and surface 212b is approximately 18 degrees to horizontal (relative to beam 204) to provide a 90 degree deflection of the portion of the beam reflected from the prism 211 to the detector/regulation apparatus. In this example, the principal laser beam 216 exits the prism 211 approximately parallel to the original beam orientation 204.

In summary, surface 202a is aligned effectively near Brewster's angle. Surface 202b is angled to the beam 210. Note that the refraction and reflection at surface 202b is not shown. Surface 202b can be coated or uncoated. In embodiments of the present invention, prisms 201 and 211 can be beamsplitters. Prism 211 has surface 212a angled to beam 210. Surface 210 can be either uncoated or coated, as previously described herein. Prism 201 disperses the red and ultra-violet light. Prism 211 serves as a beamsplitter and to align the beam 216 parallel to beam 204.

In system 200B, the beam 210 enters the beamsplitter 211 at approximately 7 degrees to normal, and exits surface 212c at approximately 5 degrees to Brewster's angle. The beamsplitter's wedge in this case is approximately 35 degrees, and surface 212b is approximately 18 degrees to horizontal (relative to beam 204) to provide a 90 degree deflection of the portion of the beam reflected from the beamsplitter 211 to the detector/regulation apparatus. In this example, the principal laser beam 216 exits the beamsplitter 211 approximately parallel to the original beam orientation 204.

In system 200B according to embodiments of the present invention, either or both prism 201 or prism 211 can serve as the output coupler.

Figure 3:
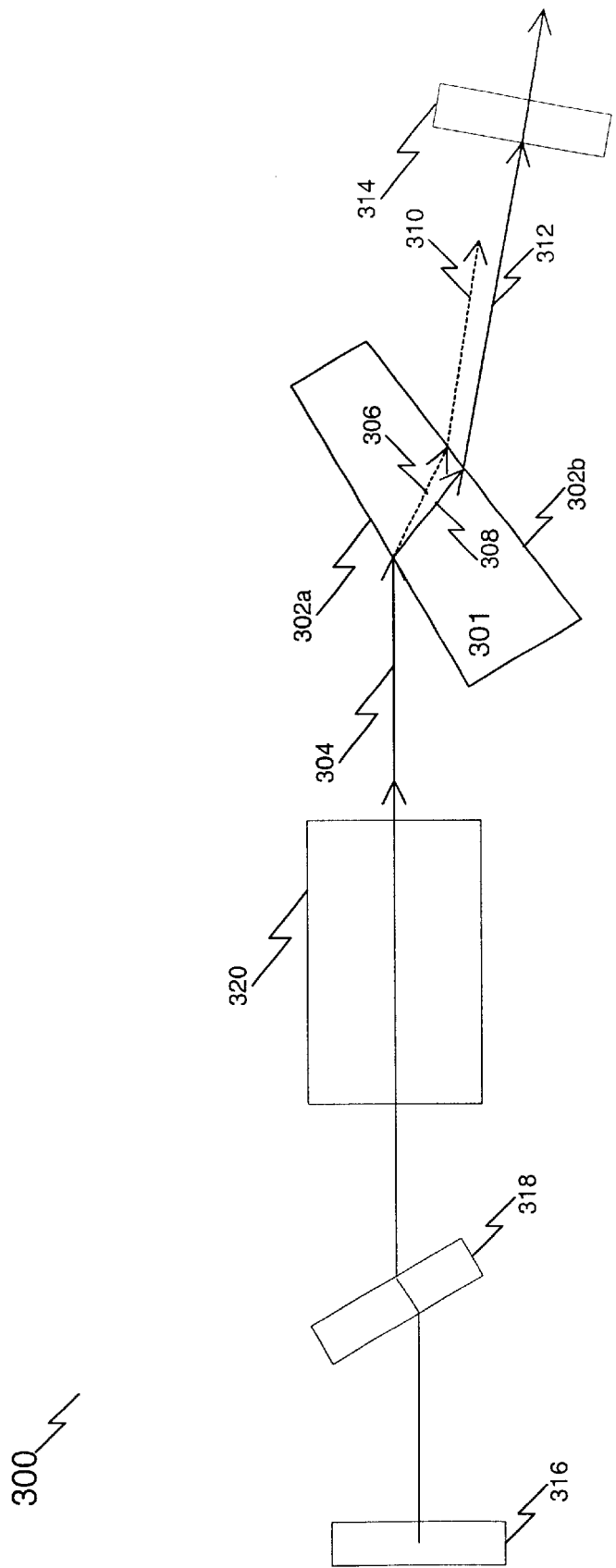
FIG. 3 is a schematic illustration of an optical projection system, according to a further embodiment of the invention.

Referring to FIG. 3, a schematic illustration of a modified optical component, according to a further embodiment of the invention, is shown. The system 300 includes reflector 316 that can include wavelength selective and/or line-narrowing properties. Laser gain medium 320 is similar to the laser gain mediums implemented in systems 100A and 100B, as described above. Brewster's angle windowing device 318 provides some polarization of the laser's output and in embodiments using excimer lasers, can also include a sealing surface for the laser's gas-discharge vessel.

The dispersive optical component 301 replaces a nominally Brewster's angle polarizing component intra-cavity to the laser. In this embodiment, the wedge angle between surfaces 302a and 302b is generally chosen to be the smallest angle that will achieve the required spatial and angular separation of the red component 310 and ultraviolet component 312 of the laser emission 304 for a given application.

This minimization of wedge angle maintains the polarizing properties of component 301 with minimum loss of laser output. In an example, a calcium fluoride wedge angle of approximately 5 degrees from surface 302a and 302b achieves this separation approximately 350 mm following the optical component, with the beam deviating by approximately 5 degrees from its direction if surfaces 302a and 302b were parallel to each other.

In one embodiment, the component of surface 302a can serve as a sealing boundary of the gas vessel (gain medium vessel) in an excimer laser. In another embodiment, beam displacement compensation is an issue of convenience in alignment rather than required or intended by the placement of the component of surface 302a.

In another embodiment, surface 302b is slightly off Brewster's angle and uncoated, such that effectively all of either or both of the beams 308 and 306 are transmitted.

Figure 4A:
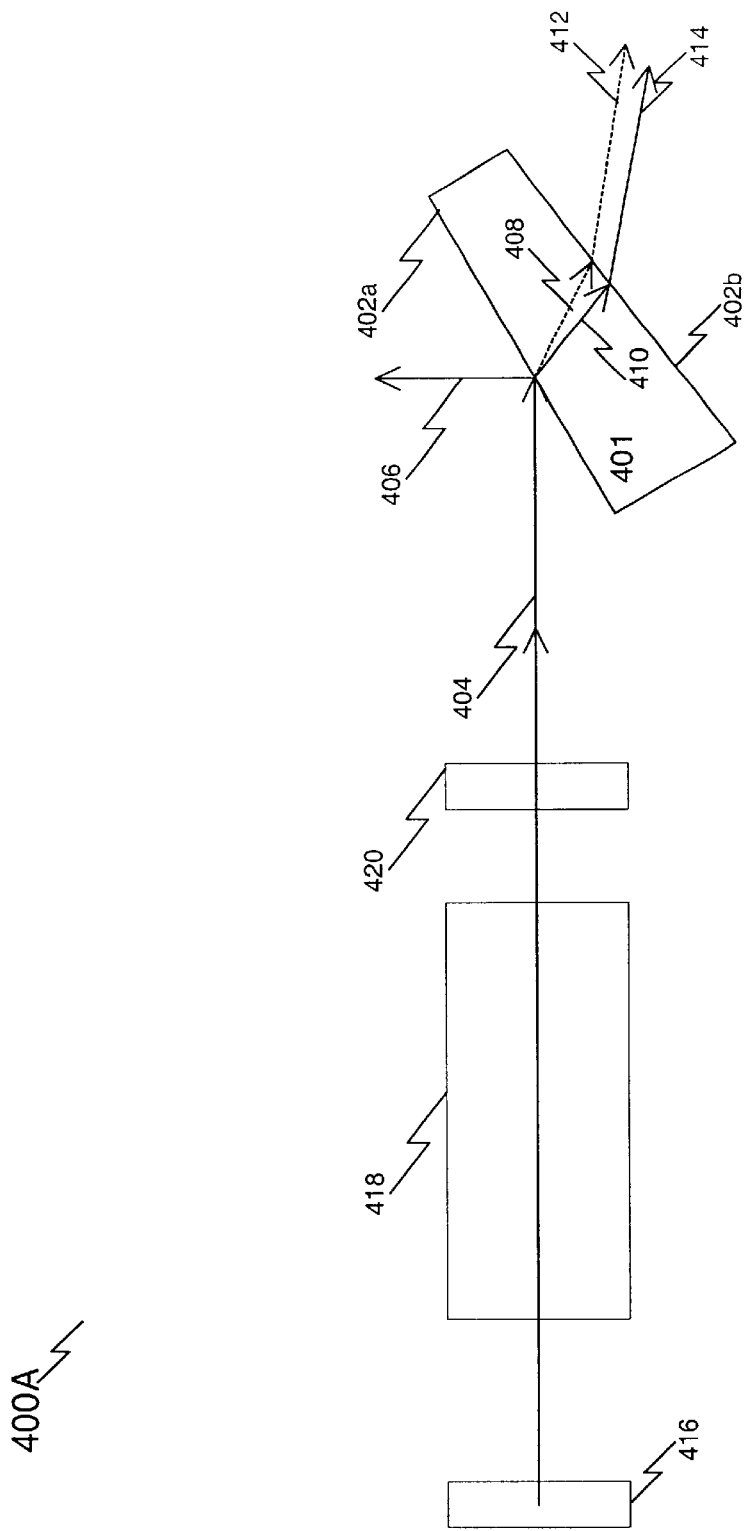
FIG. 4A is a schematic illustration of an optical projection system, according to yet a further embodiment of the invention.

Referring to FIG. 4A, a schematic illustration of a modified optical component, according to yet another embodiment of the invention, is shown. The system 400A includes reflector 416, and laser gain medium 418. Laser output coupler 420 provides similar functionality as the output couplers described herein.

Figure 4B:
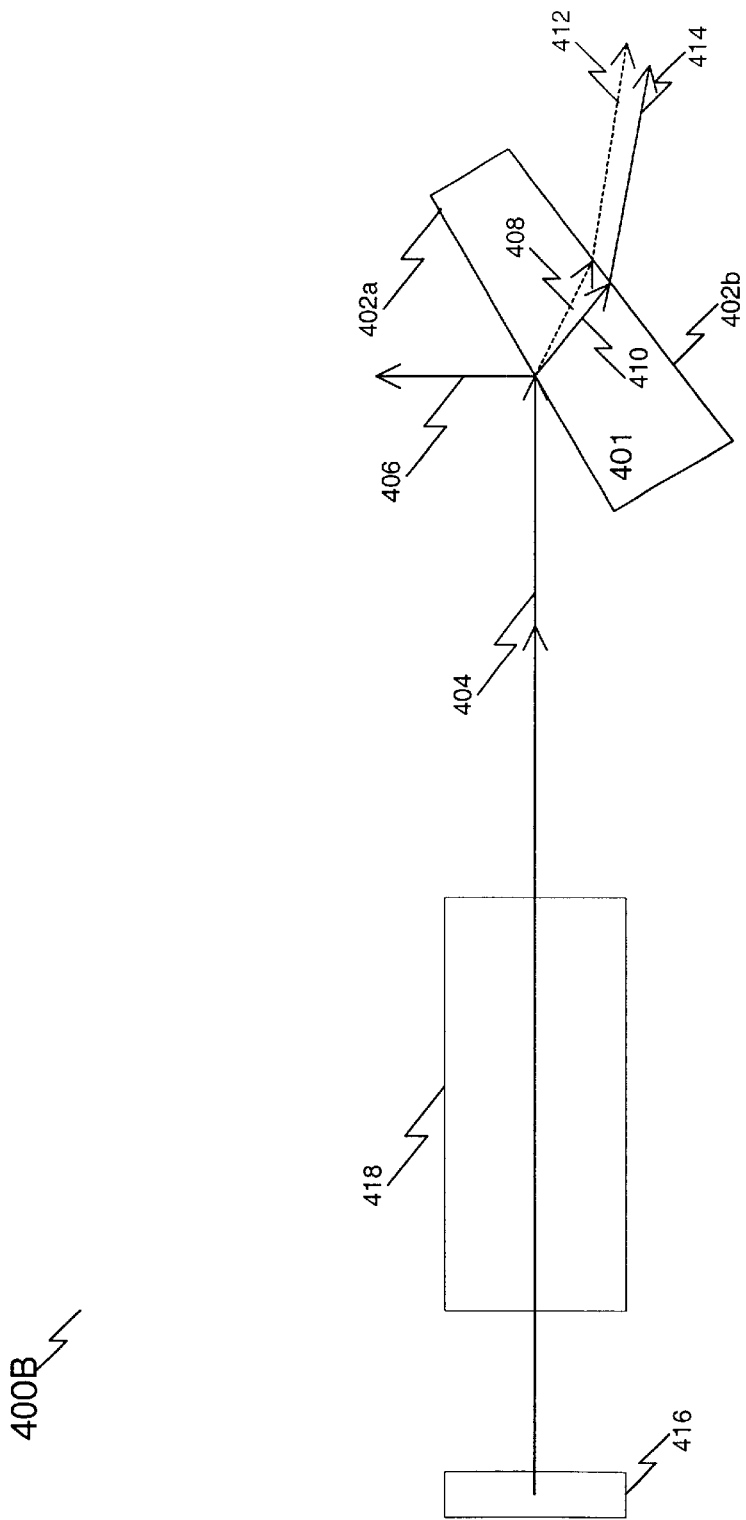
FIG. 4B is a schematic illustration of an optical projection system, according to still another embodiment of the invention.

In an alternative embodiment, shown in FIG. 4B, output coupler 420 is removed and surface 402a altered to provide its functionality. In one embodiment, surface 402a can be altered by the application of an anti-reflective coating.

The surface 402a of a beamsplitter 401 is used in a conventional manner at approximately 45 degrees to the incident laser beam 404, reflecting a portion 406, perhaps toward a beam monitoring and regulation apparatus.

The beamsplitter 401 is wedged between 402a and 402b such that the dispersion separates the red component 412 and ultraviolet component 414 of the laser output beam.

In an embodiment, the wedge angle is chosen to be large enough to provide convenient separation of the components 412 and 414 within a required distance from the laser. For example, the application can be limited by any restrictions on the angle at which the beam may exit the laser chassis.

In an embodiment, a calcium fluoride wedge angle of approximately 5 degrees of surface 402a and 402b achieves separation of the red component 412 and ultraviolet component 414 approximately 350 mm following the optical component, with the beam deviating by approximately 5 degrees from the direction resulting from the use of a conventional, plane-parallel beamsplitter.

V. Alternative Implementations

While the embodiments and implementations of the present invention are described above with respect to modifications to the laser output coupler and the addition or modification of the beamsplitter optic components after the laser output coupler, it should be understood, however, that the present invention is not limited to these components. It will be apparent to one skilled in the relevant art(s), based at least on the teachings described herein, that various changes in form and detail of other optic components can be made to achieve the same results. For example, alterations can be made to intra-cavity polarizing optic components (such as a wave-plate or combinations of wave-plates), either alone or in combination with the embodiments described herein, to separate the emissions of the laser output beams as described herein.

VI. Conclusion

While various embodiments of the invention have been described above, it should be understood that they have been presented by way of example, and not limitation. It will be apparent to persons skilled in the relevant art that various changes in form and detail may be made therein without departing from the spirit and scope of the invention. This is especially true in light of technology and terms within the relevant art(s) that may be later developed. Thus, the invention should not be limited by any of the above-described exemplary embodiments, but should be defined only in accordance with the following claims and their equivalents.

What is claimed is:

1. An optical projection system, comprising:
    a laser generator that generates a laser beam including red light emission and ultraviolet light emission, wherein said laser includes a reflector end and an output end; and
    a wavelength-dispersive component located at said output end that separates said red light emission from said ultraviolet light emission such that said red light emission and said ultraviolet emission travel in different directions, whereby the presence of said red light emission is reduced in said laser beam.

2. The system of claim 1, wherein said wavelength-dispersive component comprises a prism having a first surface and a second surface, the first surface being arranged at an angle with respect to said second surface.

3. The system of claim 2, wherein the laser beam travels along an optical axis, and said first surface is arranged perpendicular to the optical axis and said angle between the first surface and second surface is equal to or between 3 and 40 degrees.

4. The system of claim 2, wherein the laser beam travels along an optical axis, and said first surface is arranged perpendicular to the optical axis and said angle between the first surface and second surface is greater than one degree.

5. The system of claim 2 wherein said laser generator includes a laser gain medium between a reflector and an output coupler.

6. The system of claim 5, wherein said output coupler comprises an optical element that modifies the reflectivity of one or more of its optical surfaces.

7. The system of claim 2, wherein said output end of said laser generator is wavelength dispersive.

8. The system of claim 1, wherein said laser generator emits light in a wavelength range that includes a wavelength range of 156 nanometers (nm) to 159 nm, and wherein said wavelength-dispersive component consists of a single wedge prism made of calcium fluoride.

9. The system of claim 1, wherein:
    said laser generator includes a laser gain medium arranged along an optical path between a reflector and wavelength dispersive component,
    said laser generator emits light in a wavelength range that includes a wavelength of 157 nm, and
    said wavelength-dispersive component consists of a single wedge prism made of calcium fluoride and has a wedge angle of approximately 11 degrees, whereby, red light emission is fully separated from ultraviolet light emission in an output laser beam exiting said single wedge prism.

10. The system of claim 1, wherein said wavelength-dispersive component comprises first and second prisms.

11. The system of claim 10, wherein said laser generator includes a laser gain medium between a reflector and an output coupler, said first and second prisms being arranged along an optical path downstream of said output coupler.

12. The system of claim 10, wherein said laser generator includes a laser gain medium between a reflector said first prism.

13. The system of claim 12, where in said laser generator emits light in a wavelength range that includes a wavelength of 157 nm, and wherein said first and second prisms each consist of a single prism made of calcium fluoride.

14. The system of claim 10, wherein said first prism includes a first surface and a second surface, whereby said first surface is positioned effectively near Brewster's angle relative to said laser beam incident on said first surface.

15. An optical projection system, comprising:
    a laser gain medium that generates a beam including red light emission and ultraviolet light emission;
    a reflector;
    an output coupler;
    an angle windowing device; and
    a wavelength-dispersive component, said laser gain medium, reflector, output coupler, angle windowing device, and wavelength-dispersive component being arranged along a common optical path, wherein said wavelength-dispersive component separating said red light emission from said ultraviolet light emission such that said red light emission and said ultraviolet emission travel in different directions, whereby the presence of said red light emission is reduced in a laser beam output from the output coupler.

16. A photolithography system with an ultraviolet light illumination, comprising:
    a laser generator that generates an laser beam including red light emissions and ultraviolet light emissions; and
    a wavelength-dispersive component that separates said red light emissions from said ultraviolet light emissions to travel in different directions, such that an output beam with reduced red light emissions is output to illuminate a reticle and expose a material undergoing fabrication.

17. A method for optimizing the output beam characteristics of a laser that illuminates a photolithography system, comprising the steps of:
    generating a laser beam that includes red light emissions and ultraviolet light emissions;
    separating said red light emissions from said ultraviolet light emissions to travel in different directions and produce an output laser beam with reduced red light emissions; and
    illuminating a reticle with the output laser beam, whereby a material undergoing fabrication is exposed with the output beam having ultraviolet light emissions and reduced red light emissions.

* * * * *

UNITED STATES PATENT AND TRADEMARK OFFICE
CERTIFICATE OF CORRECTION

PATENT NO.     : 6,570,713 B2                                            Page 1 of 1
DATED          : May 27, 2003
INVENTOR(S)    : Steven N. Bittenson It is certified that error appears in the above-identified patent and that said Letters Patent is hereby corrected as shown below:

Column 11,
Line 49, please replace "2 wherein" with -- 2, wherein --.

Column 12,
Line 14, please replace "reflector said" with -- reflector and said --.
Line 16, please replace "where in" with -- wherein --.

Signed and Sealed this

Fourteenth Day of October, 2003

JAMES E. ROGAN
*Director of the United States Patent and Trademark Office*